Patented May 17, 1932

1,858,662

UNITED STATES PATENT OFFICE

FRIEDRICH FELIX AND OTTO ALBRECHT, OF BASEL, SWITZERLAND, ASSIGNORS TO SOCIETY OF CHEMICAL INDUSTRY IN BASLE, OF BASEL, SWITZERLAND

SULPHONATION PRODUCTS AND PROCESS OF MAKING SAME

No Drawing. Application filed October 24, 1930, Serial No. 491,068, and in Switzerland October 29, 1929.

This invention relates to new sulphonation products which are valuable auxiliaries in the textile industry. More particularly it is concerned with the new auxiliaries, their preparation, and their use.

According to this invention new valuable sulphonation products soluble in water are obtained by causing sulphonated aromatic carboxylic acids and inorganic sulphonating agents to react on unsaturated higher fatty acid compounds, in this specification and in the claims, are comprised by the term unsaturated higher fatty.

The term unsaturated higher fatty acid compounds is to be understood to include the free acids, such as oleic acid, ricinoleic acid, ricinelaidic acid, ricino-stearolic acid, or the like, or their esters, such as ricinoleic acid propyl ester, ricinoleic acid butyl ester or the like, and especially their glycerides, particularly castor oil, olive oil or the like; as well as the products produced by elimination of water or polymerization.

The expression sulphonated aromatic carboxylic acids includes the sulphonated monocarboxylic acids, such as sulphonated benzoic acid, sulphonated toluic acid, sulphonated chlorobenzoic acid, the sulphonated dicarboxylic acids, such as the sulphonated phthalic acids. It also includes the anhydrides of these compounds. Especially suitable is the sulphonated phthalic acid anhydride.

Suitable inorganic sulphonating agents are concentrated sulphuric acid, sulphuric acid monohydrate, chlorosulphonic acid or sulphuric acid containing sulphuric anhydride. Mixtures of these may also be used.

In some cases it is advantageous to work in the presence of suitable solvents. Such solvents are specially anhydrous unsubstituted lower fatty acids, e. g. formic acid, acetic acid, propionic acid, or the like.

This invention can be performed by causing the sulphonated aromatic carboxylic acid simultaneously with the sulphonating agent to react on the unsaturated higher fatty acid compound.

The concentrated aqueous solutions of the products thus obtained are viscous liquids which are clearly soluble in water and possess the peculiarity of highly reducing the surface tension of water. The products are very stable towards compounds which cause hardness in water, towards concentrated solutions of magnesium sulfate, and they prevent the precipitation of lime soaps.

This invention can also be performed by first causing sulphonated aromatic carboxylic acids, or more advantageously their anhydrides, to react on the unsaturated higher fatty acid compounds, if necessary in the presence of a solvent, and then sulphonating the reaction product of the first step. The products thus obtained have similar properties to those described above; they are moreover stable towards carbonization and mercerizing liquors.

The products obtained in accordance with the invention are suitable for the various purposes of the textile, leather and allied industries, for example for cleaning, wetting in neutral, acid or alkaline baths, and as additions to dye-baths, as well as for preventing separation of lime soap in soap-baths; for making dressings and finishings containing magnesium sulphate, for enhancing the tendency of carbonization and mercerizing liquors to wet the fabric and for like purposes. The products may be used for making aqueous solutions, emulsions or suspensions of compounds which are in themselves sparingly soluble, for instance dyestuffs, hydrocarbons and their substitution products, higher alcohols or the like.

The following examples illustrate the invention, the parts being by weight, the Examples 9 to 16 disclosing the use of the new products:—

Example 1

41.8 parts of phthalic acid anhydride-β-sulphonic acid, which may be made by heating the free sulphonic acid for a long time in a vacuum at 150–160° C., are dissolved in 114 parts of sulphuric acid monohydrate and in the course of about 2 hours there are dropped into the solution 57 parts of castor oil. The temperature of this mixture is kept at about 5–10° C. and the mixture is then poured upon ice, advantageously with addition of common salt. The whole is stirred for some time. The separated, oily layer is washed several times with common salt solution and the washings separated; after standing for several hours the oily product of the reaction, which is easily separated from any common salt solution which may have been thrown out of the oil, is neutralized and brought to the desired content of fatty acid or its conversion products. The product of sulphonation thus obtained is a very pale yellowish brown oil which dissolves clearly in water and can be made into froth easily. It is very stable towards constituents of hard water, towards concentrated alkali solution and towards magnesium sulphate solution.

Example 2

300 parts of phthalic anhydride are heated with 1200 parts of fuming sulphuric acid of about 24 per cent. strength so as to convert them in the known manner into phthalic acid-$\beta$-sulphonic acid. Into 123 parts of the sulphonation mass thus obtained, not further worked up, 57 parts of castor oil are allowed to drop, while stirring, in the course of 2 hours at about 5–10° C. The whole is worked up as described in Example 1 and the oil obtained has the properties described in that example.

Example 3

32.7 parts of phthalic anhydride-$\beta$-sulphonic acid are dissolved with aid of heat in 134 parts of sulphuric acid monohydrate and into the solution are run 44.6 parts of castor oil in the course of 20 minutes, while stirring. The temperature is kept below 6° C. and the mixture is allowed to stand at this temperature for about 20 minutes, whereupon it is worked up in the manner described in Example 1.

A product with similar properties is obtained when, instead of the solution of phthalic anhydride-$\beta$-sulphonic acid in sulphuric acid monohydrate, there is used the corresponding quantity of the sulphonation mass obtainable in known manner from phthalic anhydride and fuming sulphuric acid. In both cases, the product obtained is similar to that of Example 1.

The proportions named can be varied to some extent without the production of products which have essentially different properties.

Example 4

22.8 parts of phthalic anhydride-$\beta$-sulphonic acid, which may be made from the free acid, for instance by prolonged heating in a vacuum at 150–160° C., are dissolved in an equal weight of glacial acetic acid, 93.2 parts of castor oil are added to the solution and the whole is heated rapidly, preferably while stirring, to 100° C. The temperature is maintained at 100–106° C. until a sample yields a clear, feebly opalescent solution in water which happens in the course of a few minutes; the solution should foam strongly when shaken. The mass is allowed to cool, the cooling preferably being accelerated. The product thus obtained is a reddish brown oil, which yields with water a clear, feebly opalescent and strongly foaming solution and has the properties of Turkey red oil; the stability of the solution towards salts of lime, magnesium sulphate and acids, after it has been neutralized, is considerably enhanced as compared with that of Turkey red oil made in the usual manner; it also prevents the precipitation of lime soaps in flocculent form. In addition there are produced in small proportion sparingly soluble bodies, doubtless polymerization products, which settle in the vessel and may easily be separated.

100 parts of sulphuric acid monohydrate are introduced in the course of about 1 hour at about 0–5° C. into 100 parts of the product obtained as described in the preceding paragraph, care being taken to mix thoroughly. The mixture is then stirred for 1 hour at the same temperature and afterwards poured upon ice, preferably with the addition of common salt or Glaubers salt, and the whole is stirred for a short time. The oily layer which separates is washed again with a cold solution of common salt or Glaubers salt, and the washing waters are removed. For the further separation of the aqueous portion from the oily product, the latter may be allowed to stand for some time, preferably in the cold. Cautious neutralization follows and the product is made up to the desired content of fatty acid or conversion product thereof. The sulphonation product obtained in this manner is a very feebly reddish brown oil, soluble in water to a clear solution, the solution having a strong tendency to foam; it is stable towards compounds producing hardness in water, towards dilute acids, concentrated alkali solution and magnesium sulphate solution; it induces wetting in water well and also in carbonizing acid.

A product of like properties is obtained if in the first paragraph of this example there are used only 11.4 parts of glacial acetic acid instead of 22.8 parts and the process is otherwise the same, while the product is subsequently sulphonated as described in this example, the temperature being 5–10° C. instead of 0–5° C.

Example 5

93.2 parts of castor oil and 22.8 parts of phthalic-anhydride-$\beta$-sulphonic acid are rapidly heated together to 105° C. and kept for about 5 minutes at 105–107° C. After cooling, the product is, in the main, a viscid yellowish brown oil, which yields in water a nearly quite clear opalescent solution, which foams when shaken.

100 parts of sulphuric acid monohydrate, while stirring well and in the course of about 1¼ hours, are allowed to flow into 100 parts of the product obtained as described in the preceding paragraph, the temperature being below 17° C. The whole is stirred for ½ hour at about 0–5° C. and then worked up as described in the second paragraph of Example 4. There is thus obtained a feebly reddish yellow oil, which dissolves in water to a clear solution having strong foaming properties. The solution is stable towards hard water, dilute acids, concentrated alkali solution and magnesium sulphate solution; it also prevents separation of lime soaps in flocculent form.

Example 6

93.2 parts of castor oil are heated rapidly to 105° C. with 24 parts of trichlorethylene and 22.8 parts of phthalic anhydride-β-sulphonic acid, and the mass is maintained for about 15 minutes at 105–107° C. Besides a small, sparingly soluble portion, there is obtained as the main product a yellowish brown oil which is dissolved by water to a nearly quite clear, but strongly opalescent solution.

Into 100 parts of the product obtained as described in the preceding paragraph there are run, while mixing thoroughly, 100 parts of sulphuric acid monohydrate at a temperature below 10° C. in the course of about 1¼ hours; the mixture is stirred for about ¾ hour at 0–5° C. and then worked up as described in the second paragraph of Example 4. When obtained in this manner the sulphonation product has properties similar to those of the product described in the second paragraph of Example 5.

Example 7

100 parts of the product obtained according to the first paragraph of Example 4 are run in the course of about ¾ hour, while stirring well, into 150 parts of sulphuric acid monohydrate. By cooling, the temperature is kept at 5–10° C. After stirring for a short time at the same temperature, the mixture is worked up in the manner described in the second paragraph of Example 4. The sulphonation product is a feebly reddish brown oil, clearly soluble in water, the solution being stable towards dilute acids, hard water and concentrated alkali solution.

The products described in the foregoing examples may also be used without previous neutralization or in a condition not completely neutralized. Instead of alkali hydroxides, alkali carbonates or ammonia, organic nitrogenous bases, such as amines, oxyamines, quaternary ammonium bases, heterocyclic compounds, such as pyridine or their hydrogenation products may be used for the complete or partial neutralization, in so far as they yield salts soluble in water.

Example 8

22.8 parts of phthalic anhydride-β-sulphonic acid are heated with 45.6 parts of dry pyridine, during which operation two layers are formed. To the hot product of the reaction there are added 93.2 parts of castor oil and the whole is boiled in a reflux apparatus until a sample dissolves in water to a clear, feebly opalescent liquid. After the whole has been cooled, there is obtained, in addition to a small tough residue which collects at the bottom of the vessel, a viscid yellowish brown oil which dissolves clearly in water to form a feebly opalescent solution. After neutralization, this solution is stable to hard water, dilute acids and concentrated magnesium sulphate solution.

The proportions named in the foregoing examples may be varied within certain limits.

Example 9

10 kilos of unloaded silk skeins are dyed in the usual manner in a bath comprising
400 litres of water containing 20 gr. CaO pro 100 litres of water,
0.4 kilo of an oil obtained as described in Example 2 and of 30 per cent. strength,
0.8 kilo of Marseilles soap,
0.2 kilo of fast acid violet R (cf. Colour Index No. 758), and
6 kilos of Glaubers salt.

The silk dyed in this manner has its full lustre, whereas without the addition of the oil the lustre is partially dimmed by the separated lime soap.

Example 10

100 kilos of viscose silk are dyed as usual in the following bath:—
2500 litres of water containing 20 gr. CaO pro 100 litres of water,
2.5 kilos of an oil of 30 per cent. strength made as described in Example 2,
5 kilos of Marseilles soap,
2 kilos of direct sky blue green shade (cf. Colour Index No. 518), and
30 kilos of Glaubers salt.

No separation of lime soap occurs. The dyed viscose has a much stronger lustre than that which has been dyed without the addition of the oil.

Example 11

100 kilos of cotton yarn are wetted in 2000 litres of water containing lime, to which have been added per litre
1 gram of the oil made as described in Example 2 and of 33 per cent. strength, and
2 grams of soap.

No separation of lime soap occurs. The yarn is wetted at 20° C. in a much shorter time than it is when no addition of the wetting agent has been made.

*Example 12*

For weighting cotton piece goods the following solution may be used:

30 kilos of magnesium sulphate are dissolved in water and the solution made up to 100 litres. There are added 0.2 kilo of the oil obtained as described in the second paragraph of Example 4, which has been adjusted to a fatty acid content of 33 per cent. The feel of the goods is better and the color is less muddy than when the use of the oil is omitted.

*Example 13*

Woolen piece goods are dyed in a bath in per cents. of the weight of the goods.

0.5 Benzyl Bordeaux B (cf. Colour Index No. 85)
4 Sulphuric acid,
10 Glaubers salt, as well as 2 grams per litre of the oil of 33 per cent. strength made as described in the second paragraph of Example 4. The goods are more equally dyed with a better through-dyeing than when this addition is not made.

*Example 14*

Wool felt is dyed with the following conditions of the bath, in per cents. of the weight of the goods—

5 Acid black AZ (cf. Schultz 1923, second volume, page 15)
4 Sulphuric acid,
10 Glaubers salt, together with 3 grams per litre of the oil of 33 per cent. strength made as described in the second paragraph of Example 4. The through-dyeing of the felt is considerably better than when the oil is not added.

*Example 15*

100 kilos of woolen rags are impregnated with a sulphuric acid of 3–5° Bé. containing per litre 2 grams of the oil of 33 per cent. strength obtained as described in the second paragraph of Example 4. After ½ hour in the acid, the goods are centrifuged, dried and carbonized in the carbonizing oven. The strength of the acid depends on the impurities in the goods, but it is possible by addition of the said auxiliary agent to maintain the concentration considerably lower than would otherwise be the case.

*Example 16*

Dry raw thread is mercerized by means of the following solution:—

To 1000 litres of caustic soda solution of 30° Bé. are added 5 kilos of the oil made as described in the second paragraph of Example 4, and having a fatty content of 33 per cent., to which, before neutralization, so much methylcyclohexanol has been added that the percentage content of the finished product in methylcyclohexanol amounts to 5 per cent. The mercerization process occupies an essentially shorter time than when the addition is omitted.

What we claim is:—

1. A process of producing new sulphonation products of unsaturated higher fatty acid compounds, which comprises the action of sulphonated aromatic carboxylic acids and of inorganic sulphonating agents on unsaturated higher fatty compounds.

2. A process of producing new sulphonation products of unsaturated higher fatty acid esters, which comprises the action of sulphonated aromatic dicarboxylic acids and of inorganic sulphonating agents on higher unsaturated fatty acid esters.

3. A process of producing new sulphonation products of unsaturated higher hydroxy-fatty acid esters, which comprises the action of sulphonated aromatic dicarboxylic acid anhydrides and of inorganic sulphonating agents on unsaturated higher hydroxy-fatty acid esters.

4. A process of producing new sulphonation products of unsaturated higher hydroxy-fatty acid glycerides, which comprises the action of sulphonated phthalic acid anhydride and of inorganic sulphonating agents on unsaturated higher hydroxy-fatty acid glycerides.

5. A process of producing new sulphonation products of castor oil, which comprises the action of sulphonated phthalic acid anhydride and of inorganic sulphonating agents on castor oil.

6. A process of producing new sulphonation products of unsaturated higher fatty compounds, which comprises the simultaneous action of sulphonated aromatic carboxylic acids and of inorganic sulphonating agents on unsaturated higher fatty acid compounds.

7. A process of producing new sulphonation products of unsaturated higher hydroxy-fatty acid esters, which comprises the simultaneous action of sulphonated aromatic dicarboxylic acids and of inorganic sulphonating agents on unsaturated higher hydroxy-fatty acid esters.

8. A process of producing new sulphonation products of castor oil, which comprises the simultaneous action of sulphonated phthalic acid anhydride and inorganic sulphonating agents on castor oil.

9. A process of producing new sulphonation products of unsaturated higher hydroxy-fatty acid esters, which comprises acting first with sulphonated aromatic carboxylic acids, and then with inorganic sulphonating agents, on unsaturated higher hydroxy-fatty acid esters.

10. A process of producing new sulphonation products of unsaturated higher hydroxy-fatty acid glycerides, which comprises acting first with a sulphonated aromatic dicarboxylic acid anhydride, and then with an inorganic sulphonating agent, on unsaturated higher hydroxy-fatty acid glycerides.

11. A process of producing new sulphonation products of unsaturated higher hydroxy-fatty acid glycerides, which comprises acting first with a sulphonated aromatic dicarboxylic acid anhydride, and then with an inorganic sulphonating agent, on unsaturated higher hydroxy-fatty acid glycerides in the presence of an anhydrous unsubstituted lower fatty acid containing not more than three carbon atoms.

12. A process of producing new sulphonation products of castor oil, which comprises acting first with sulphonated phthalic anhydride, and then with inorganic sulphonating agents, on castor oil in the presence of an anhydrous unsubstituted lower fatty acid containing not more than two carbon atoms.

13. As new products the sulphonation products obtained by causing sulphonated aromatic carboxylic acids and inorganic sulphonating agents to react with unsaturated higher fatty acid compounds, which products, as concentrated solutions, form viscous liquids, the aqueous solutions of which are clear, and which highly reduce the surface tension of water and prevent the precipitation of lime soaps.

14. As new products the sulphonation products obtained by causing sulphonated aromatic dicarboxylic acids and inorganic sulphonating agents to react with unsaturated higher fatty acid esters, which products, as concentrated solutions, form viscous liquids, the aqueous solutions of which are clear, and which highly reduce the surface tension of water and prevent the precipitation of lime soaps.

15. As new products the sulphonation products obtained by causing sulphonated aromatic dicarboxylic anhydrides and inorganic sulphonating agents to react with unsaturated higher fatty acid glycerides, which products, as concentrated solutions, form viscous liquids, the aqueous solutions of which are clear, and which highly reduce the surface tension of water and prevent the precipitation of lime soaps.

16. As new products the sulphonation products obtained by causing sulphonated phthalic acid anhydride and inorganic sulphonating agents to react with unsaturated higher hydroxy-fatty acid glycerides, which products, as concentrated solutions, form viscous liquids, the aqueous solutions of which are clear, and which highly reduce the surface tension of water and prevent the precipitation of lime soaps.

17. As new products the sulphonation products obtained by the simultaneous action of sulphonated aromatic dicarboxylic acids, and of inorganic sulphonating agents on unsaturated higher hydroxy-fatty acid esters, which products, as concentrated solutions, form viscous liquids, the aqueous solutions of which are clear, and which highly reduce the surface tension of water and prevent the precipitation of lime soaps.

18. As new products of sulphonation products obtained by the simultaneous action of sulphonated phthalic acid anhydride and of inorganic sulphonating agents on castor oil, which products, as concentrated solutions, form viscous liquids, the aqueous solutions of which are clear, and which highly reduce the surface tension of water and prevent the precipitation of lime soaps.

19. As new products the sulphonation products obtained by the successive action of sulphonated aromatic dicarboxylic anhydrides and of inorganic sulphonating agents on unsaturated higher hydroxy-fatty acid glycerides, which products, as concentrated solutions, form viscous liquids, the aqueous solutions of which are clear, and which highly reduce the surface tension of water and prevent the precipitation of lime soaps.

20. As new products the sulphonation products obtained by the successive action of sulphonated aromatic dicarboxylic anhydrides and of inorganic sulphonating agents in the presence of anhydrous unsubstituted lower fatty acids on unsaturated higher hydroxy-fatty acid glycerides, which products, as concentrated solutions, form viscous liquids, the aqueous solutions of which are clear, and which highly reduce the surface tension of water, prevent the precipitation of lime soaps and are stable towards carbonization and mercerizing liquors.

21. As new products the sulphonation products obtained by the successive action of sulphonated phthalic acid anhydride and inorganic sulphonating agents in the presence of anhydrous unsubstituted lower fatty acids on castor oil, which products, as concentrated solutions, form viscous liquids, the aqueous solutions of which are clear, and which highly reduce the surface tension of water, prevent the precipitation of lime soaps and are stable towards carbonization and mercerizing liquors.

In witness whereof we have hereunto signed our names this 15th day of October, 1930.

FRIEDRICH FELIX.
OTTO ALBRECHT.